Aug. 15, 1933. J. W. FREE ET AL 1,922,913
APPARATUS FOR END-TO-END WELDING OF PIPE
Filed June 16, 1930   15 Sheets-Sheet 6
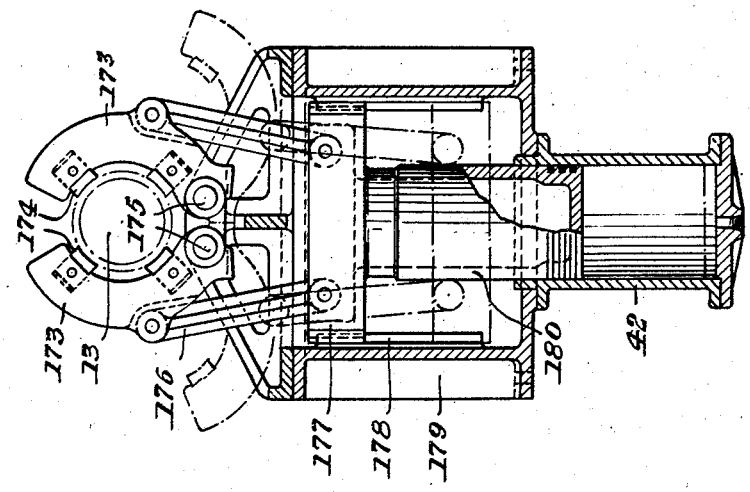
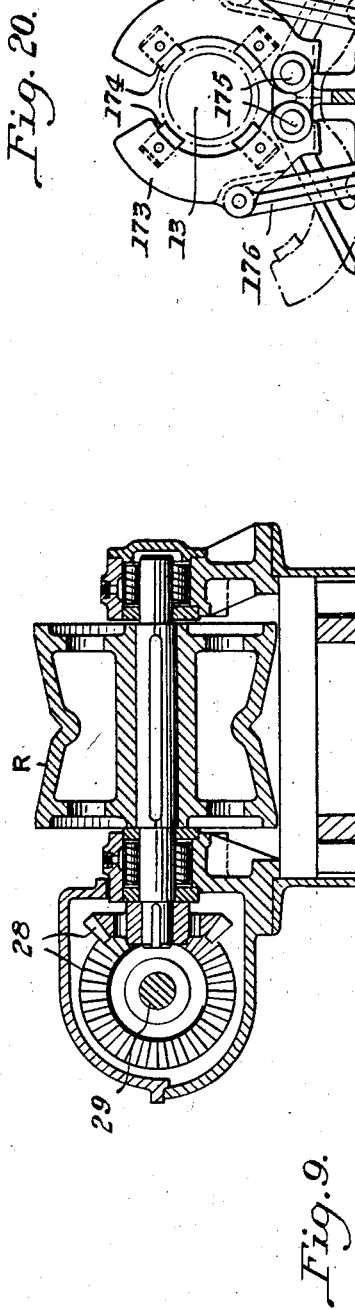
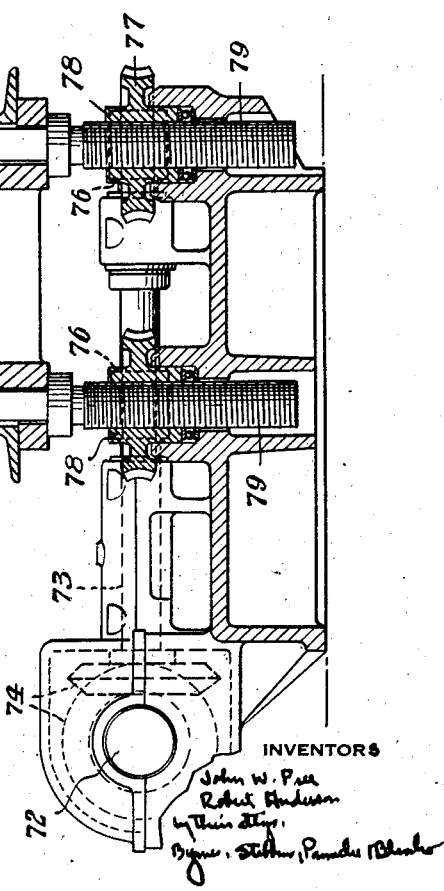

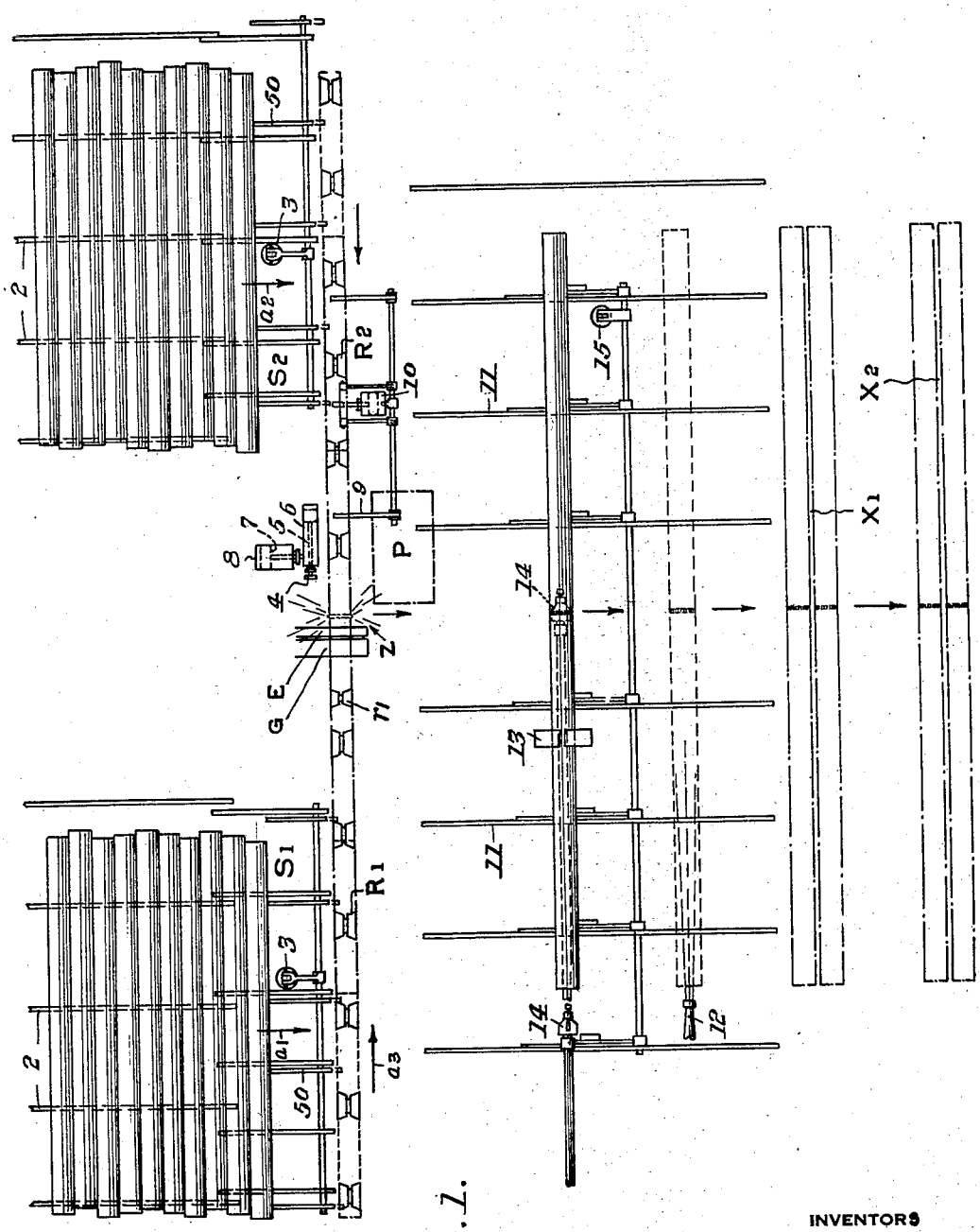

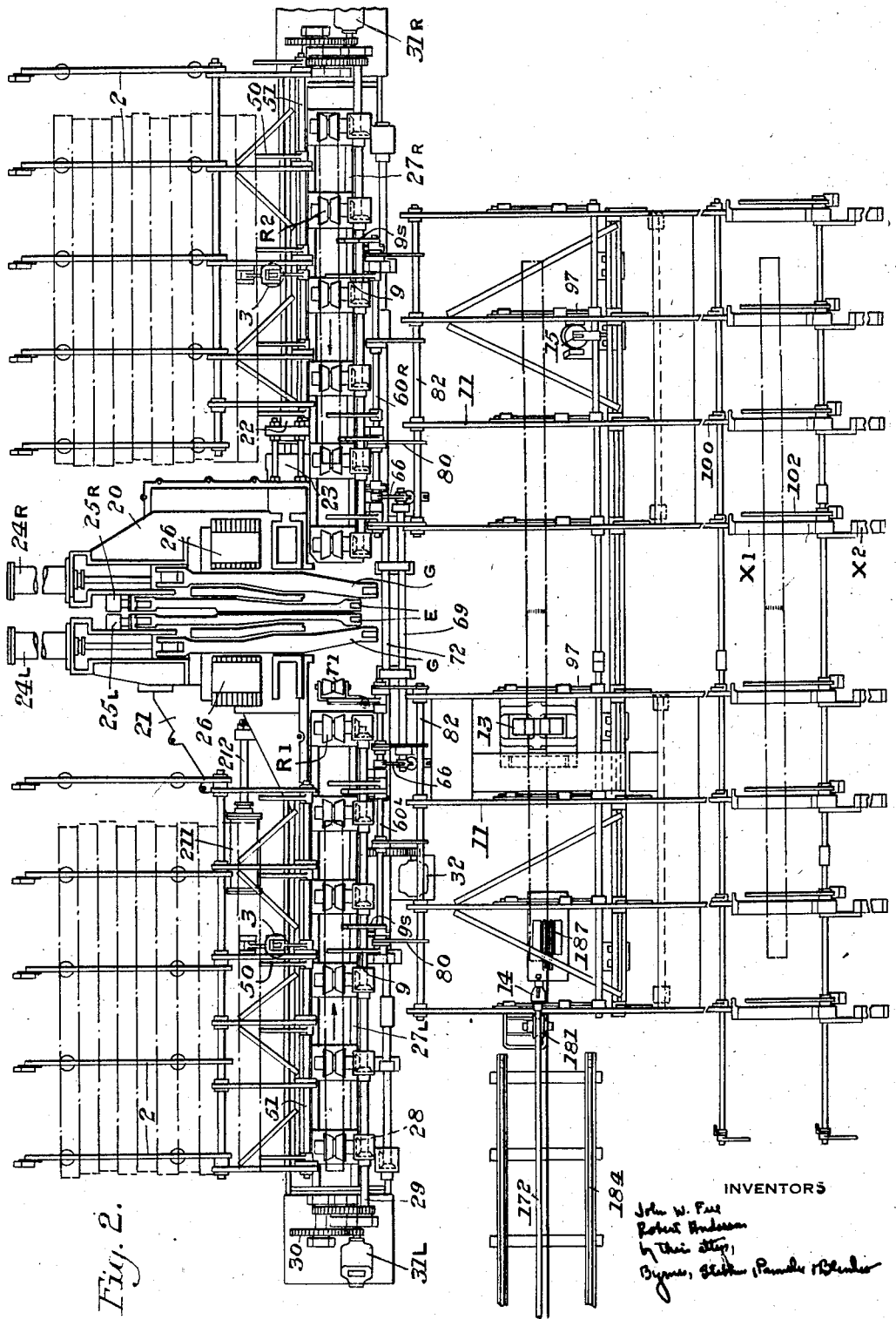

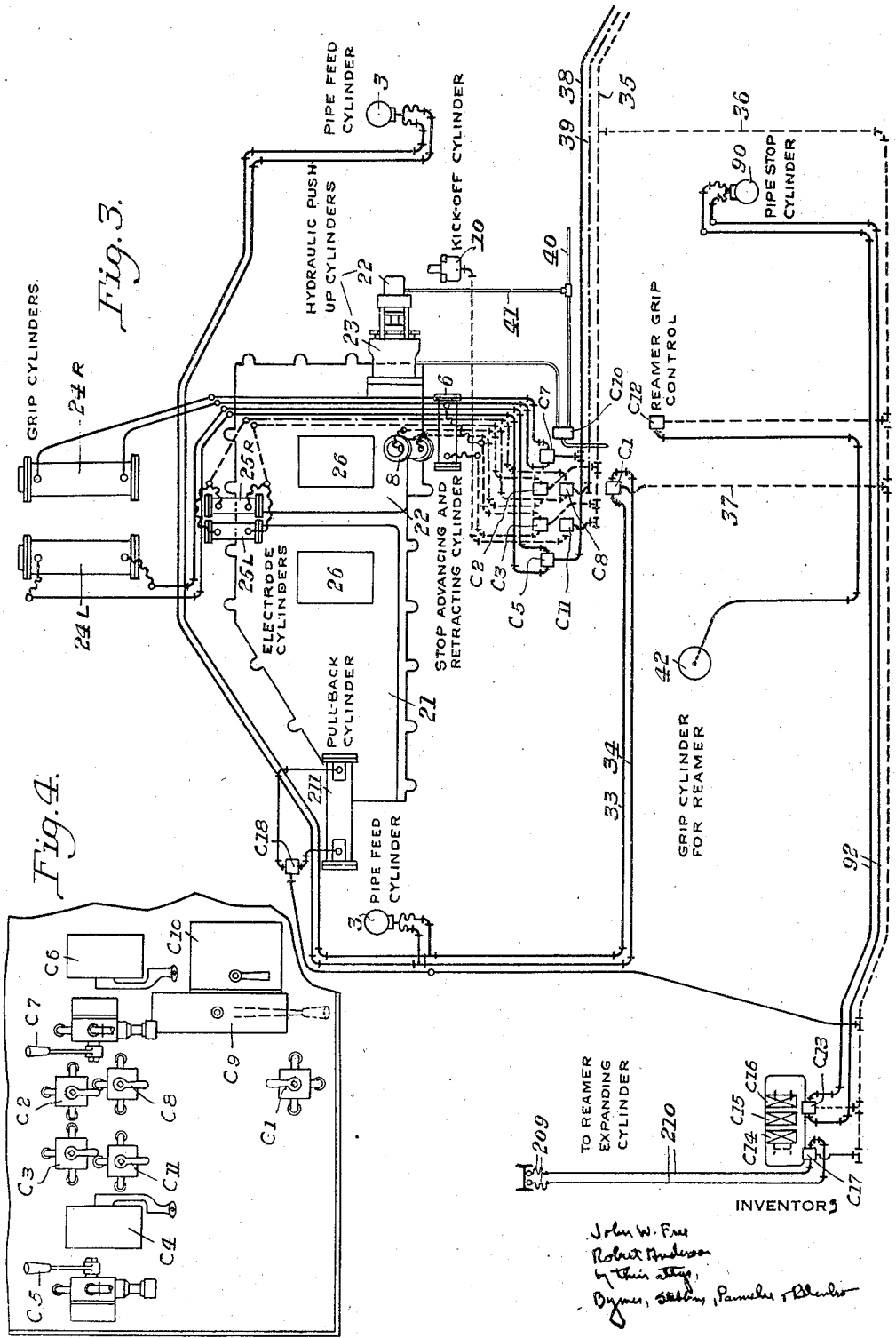

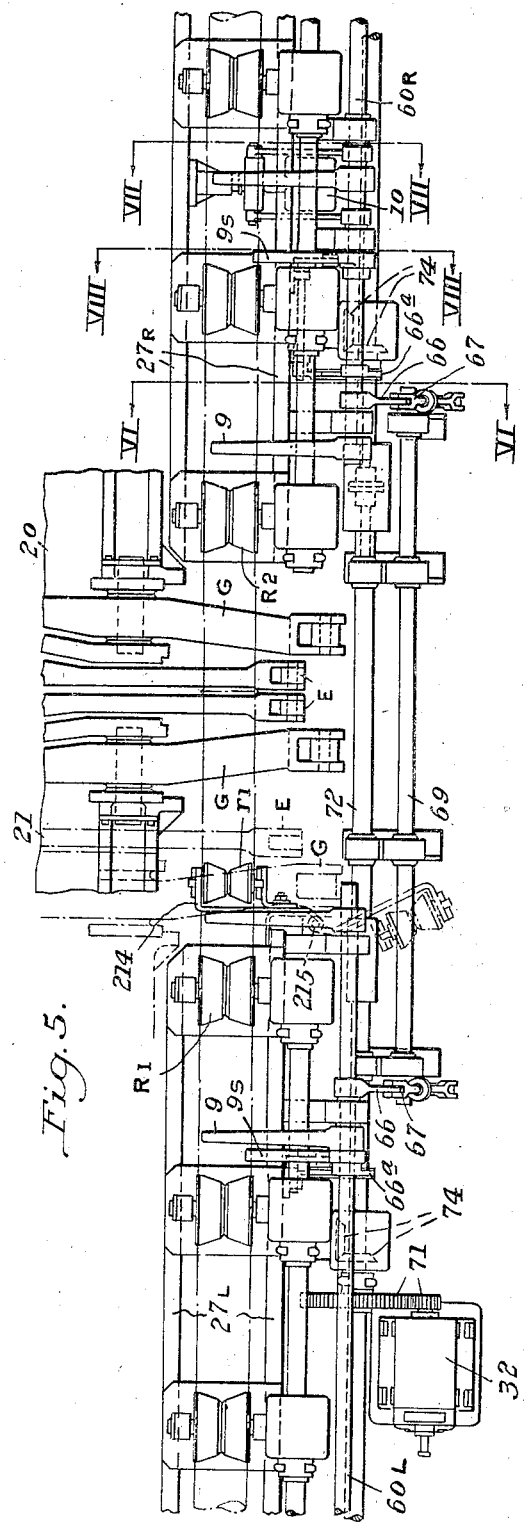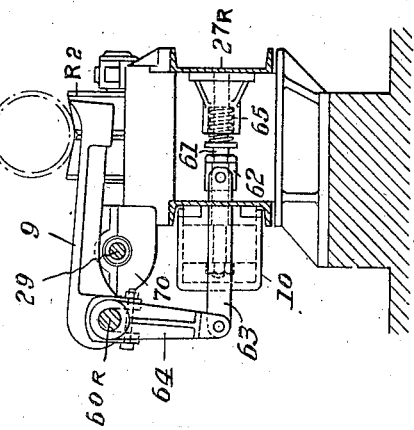

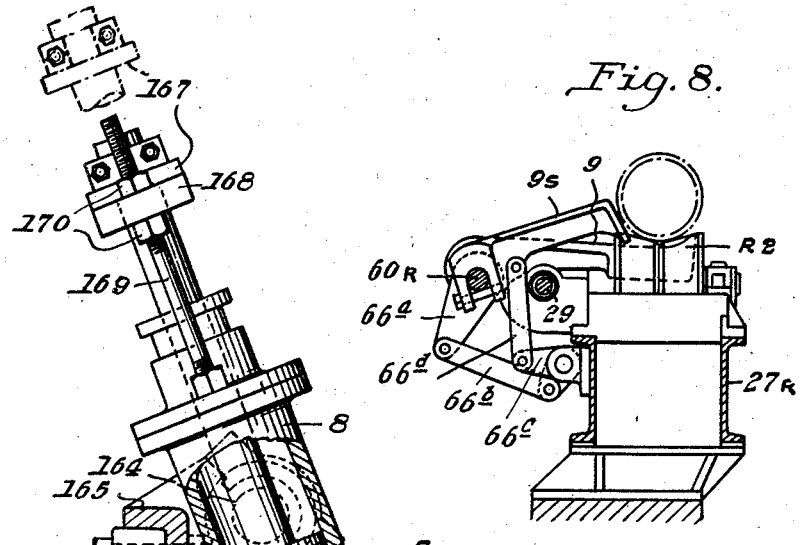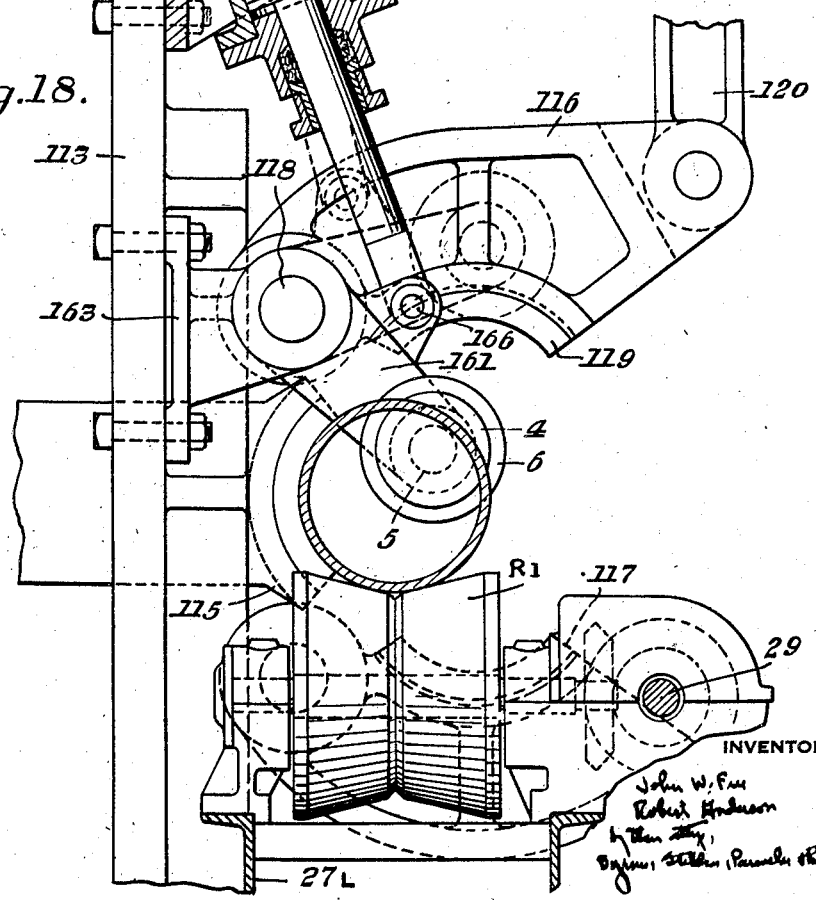

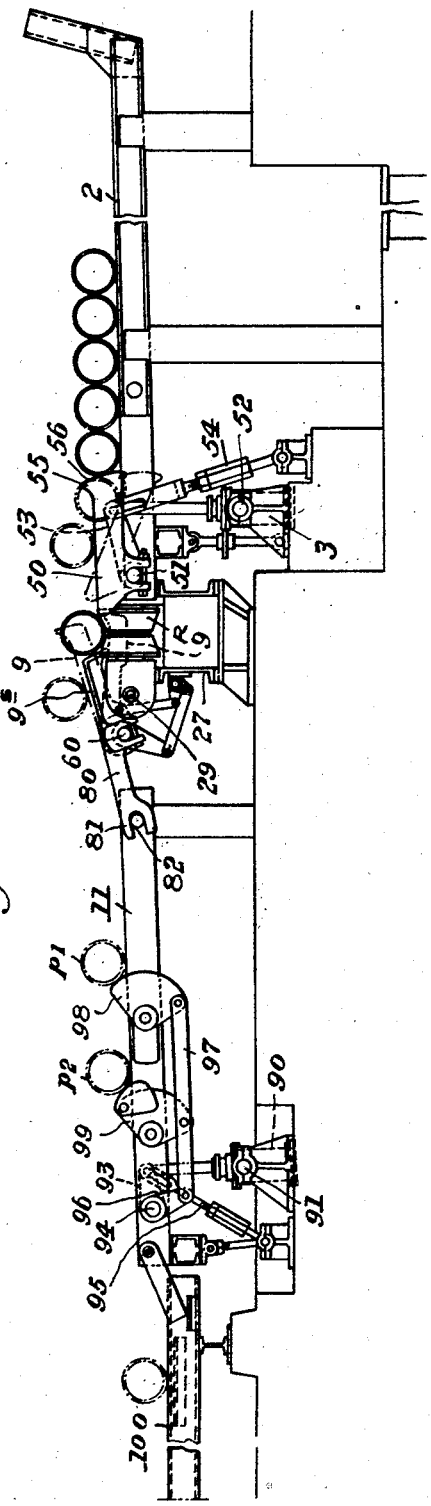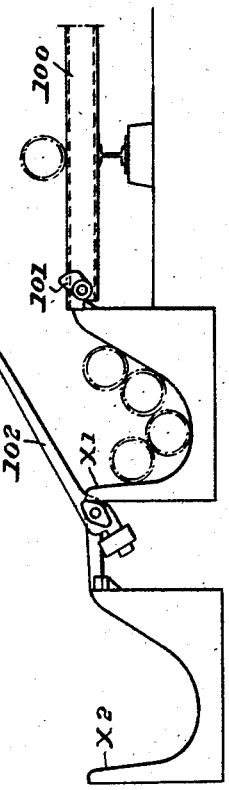

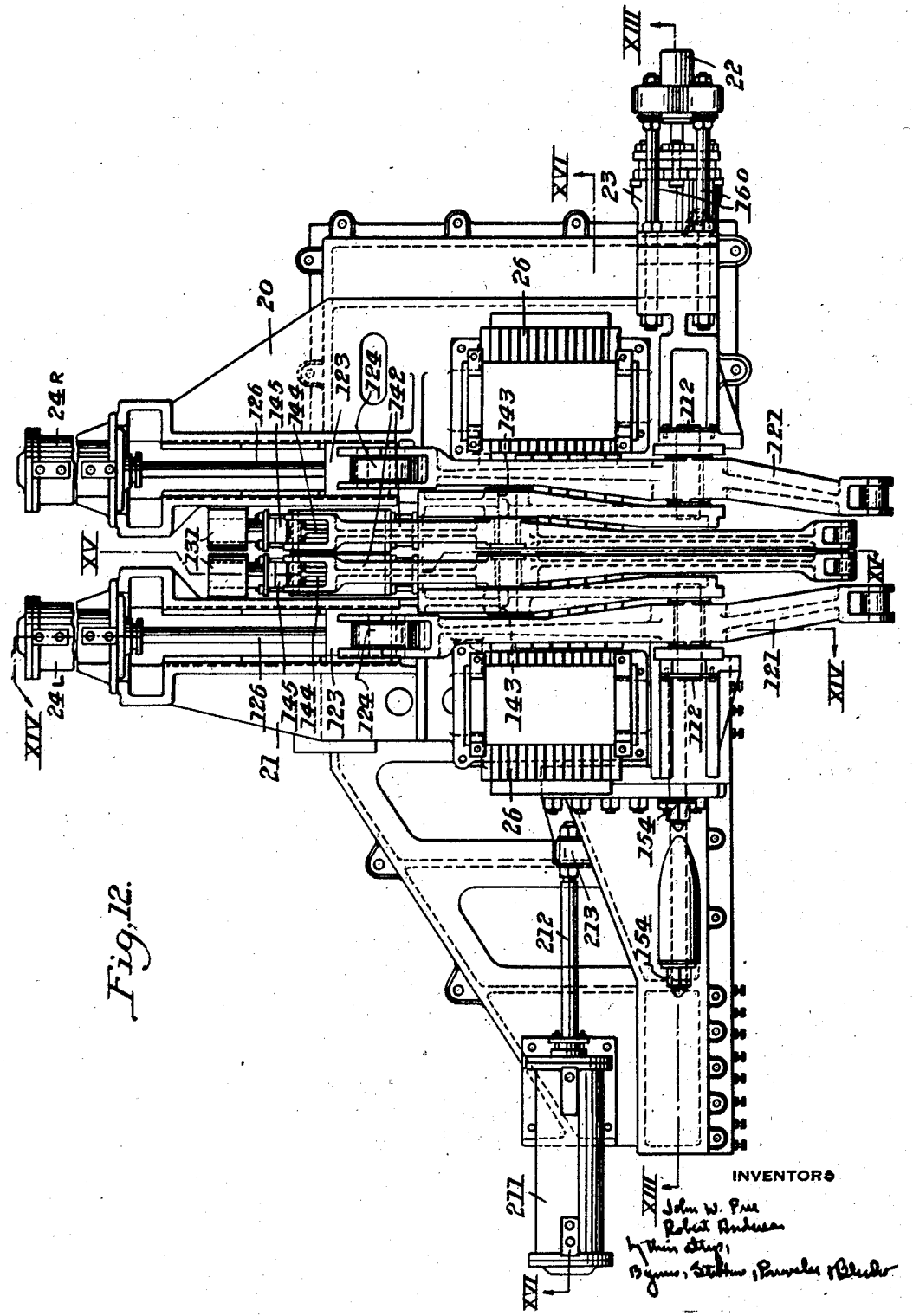

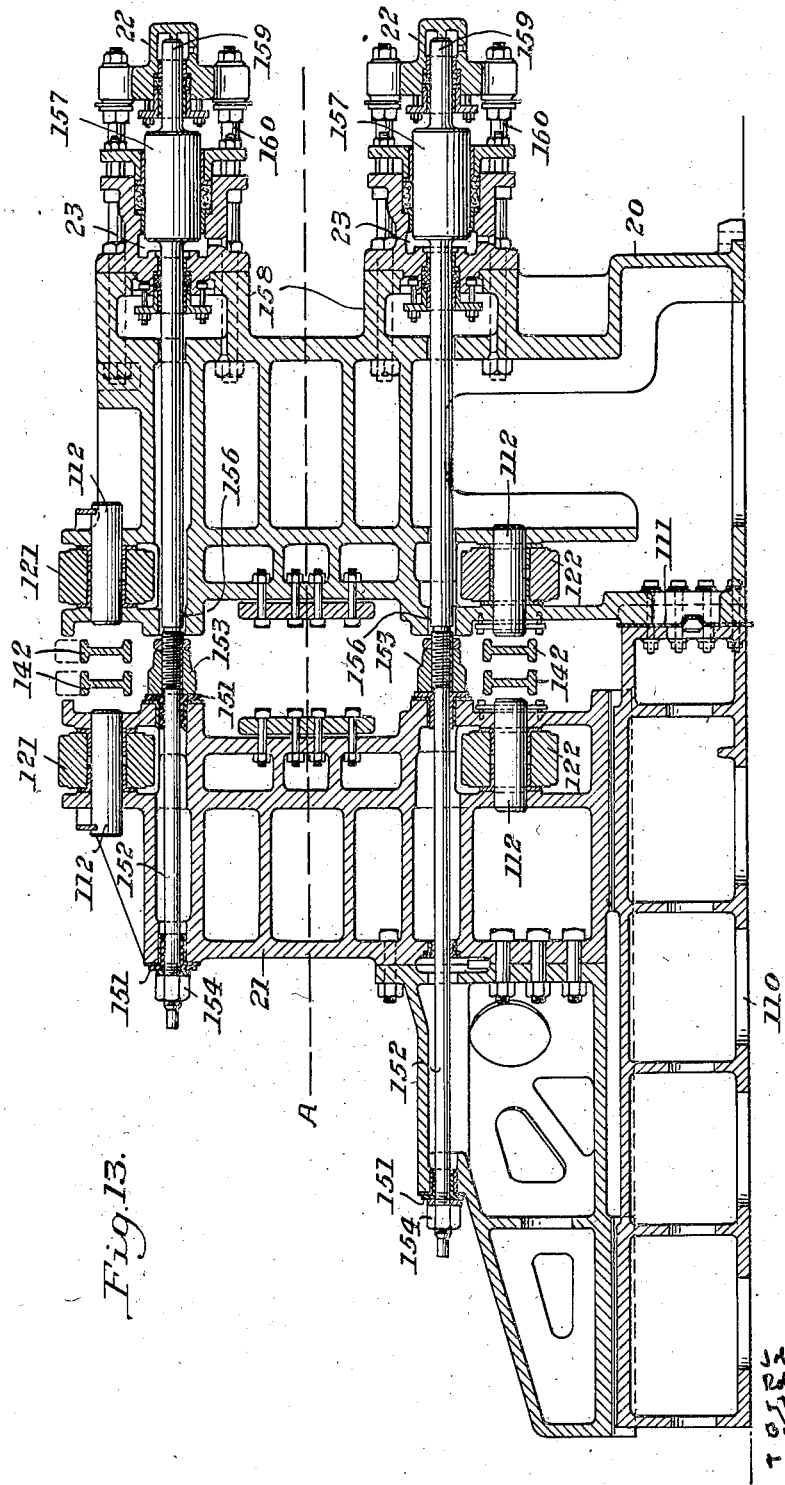

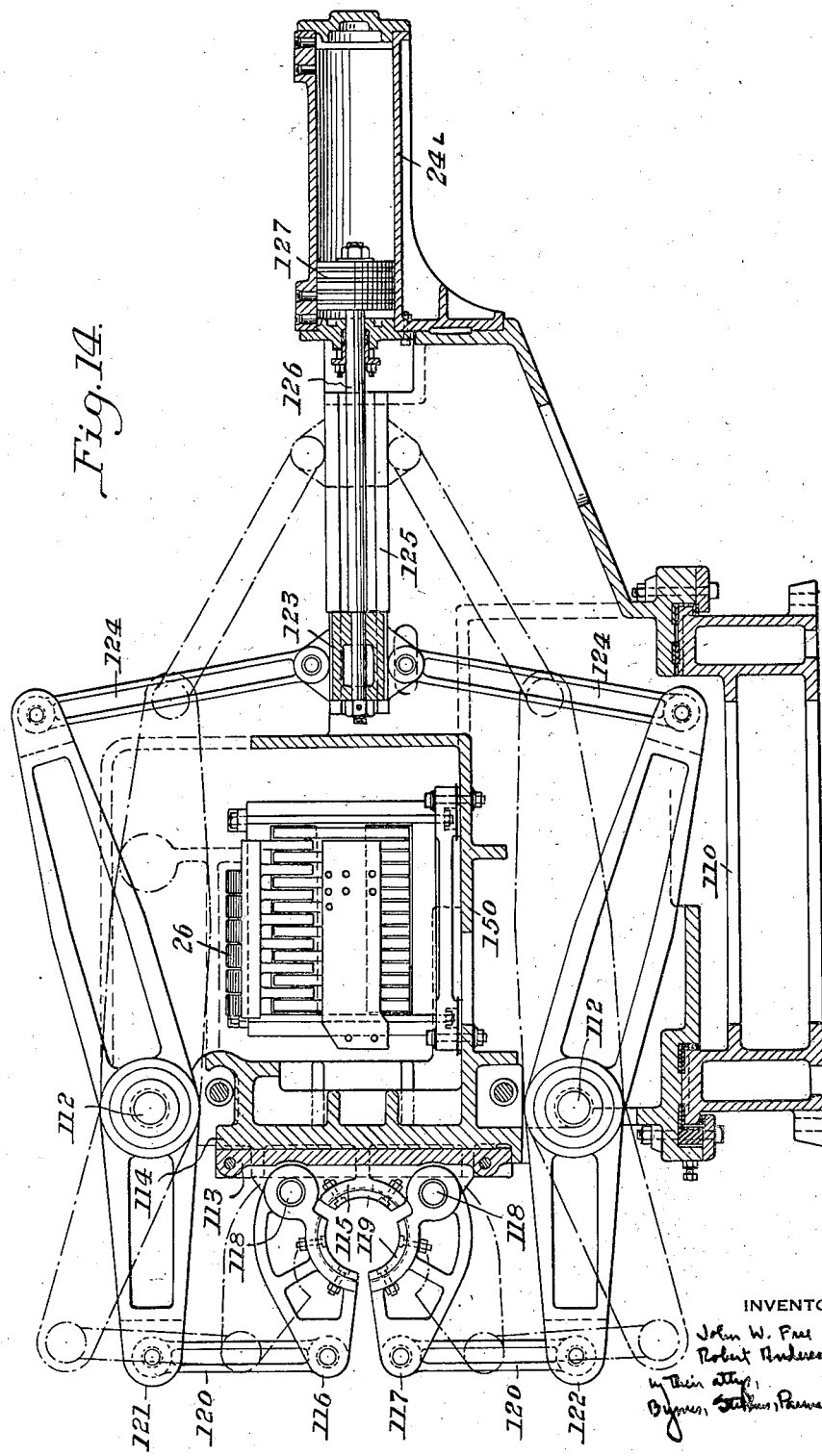

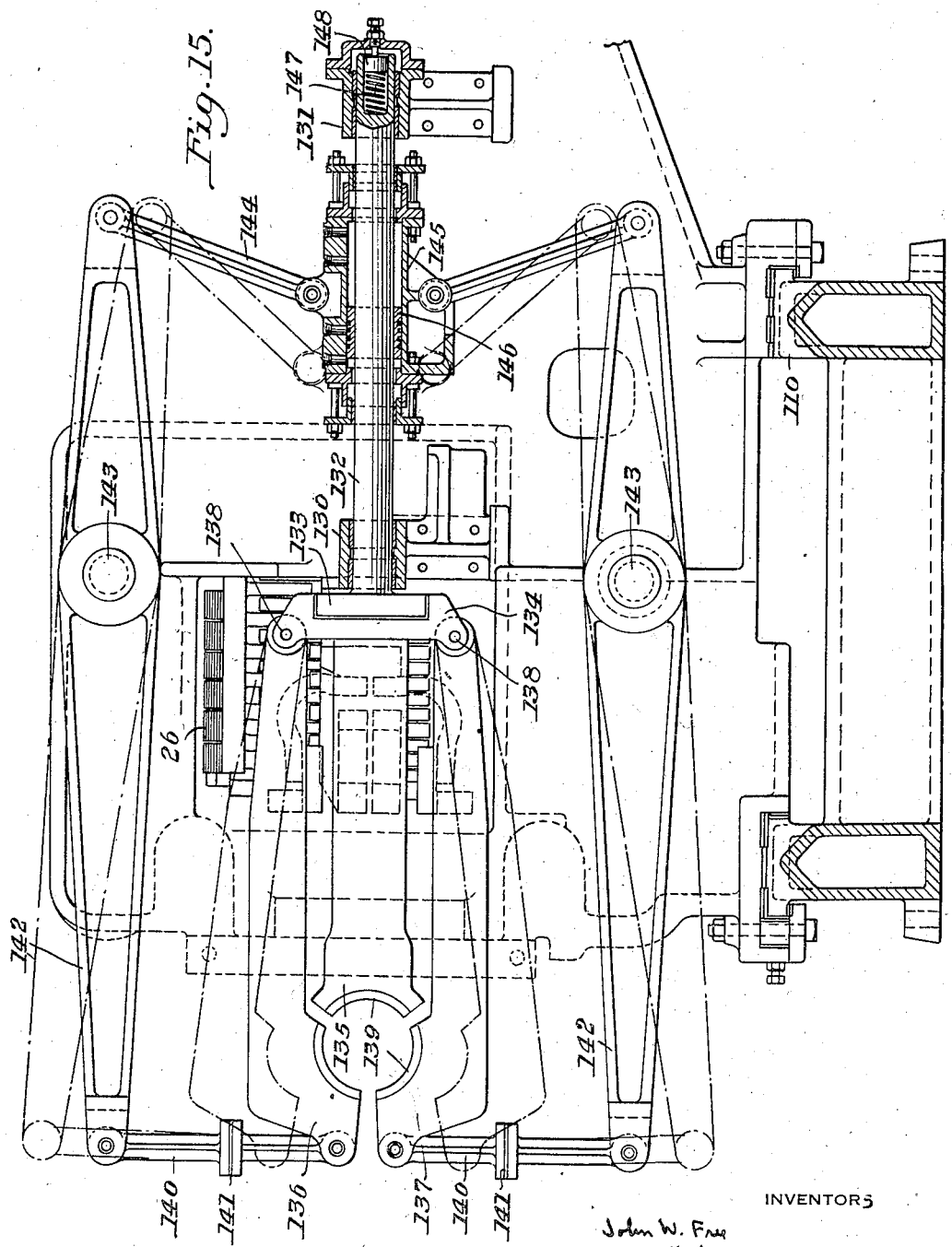

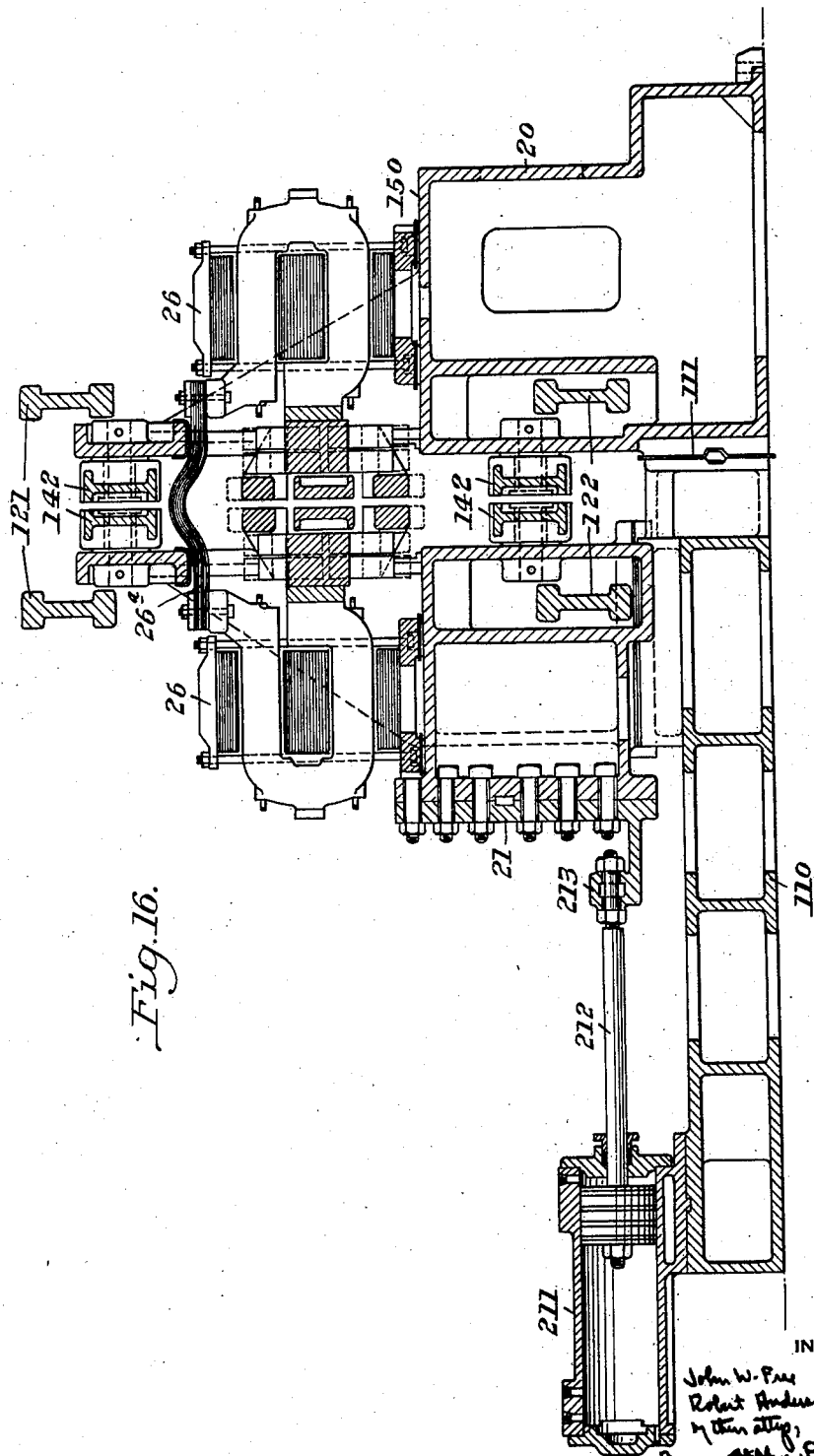

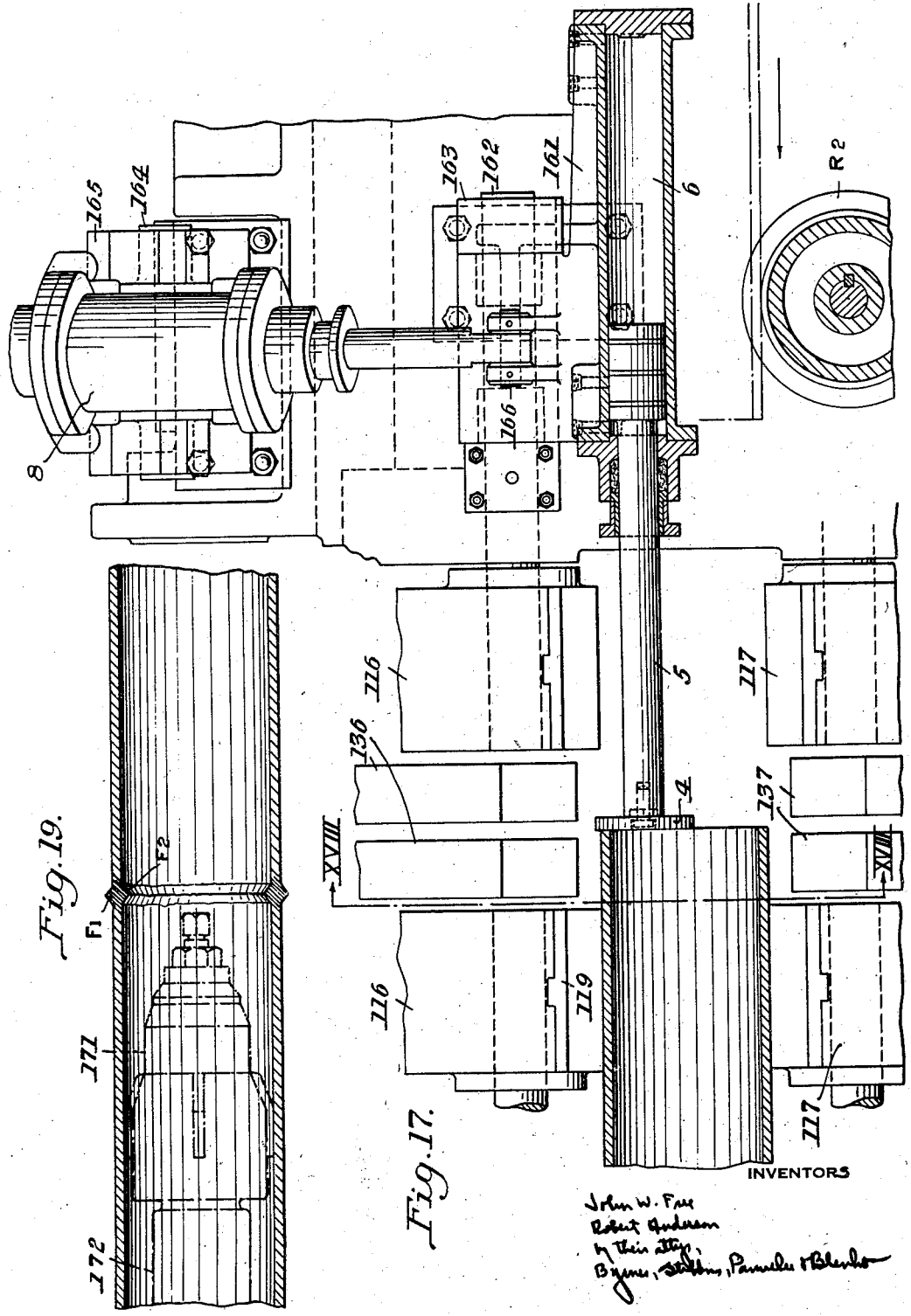

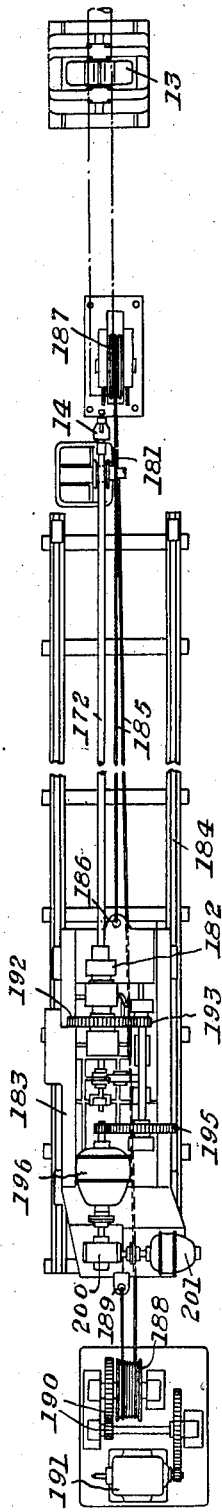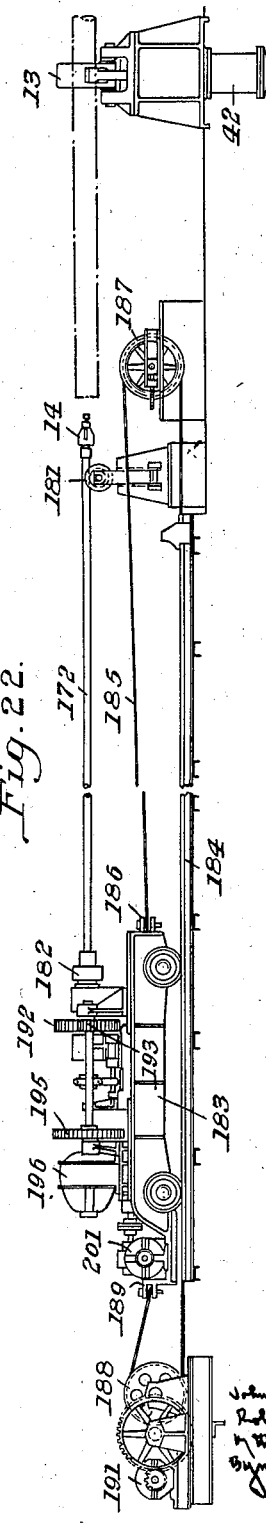

Aug. 15, 1933.   J. W. FREE ET AL   1,922,913
APPARATUS FOR END-TO-END WELDING OF PIPE
Filed June 16, 1930    15 Sheets-Sheet 15
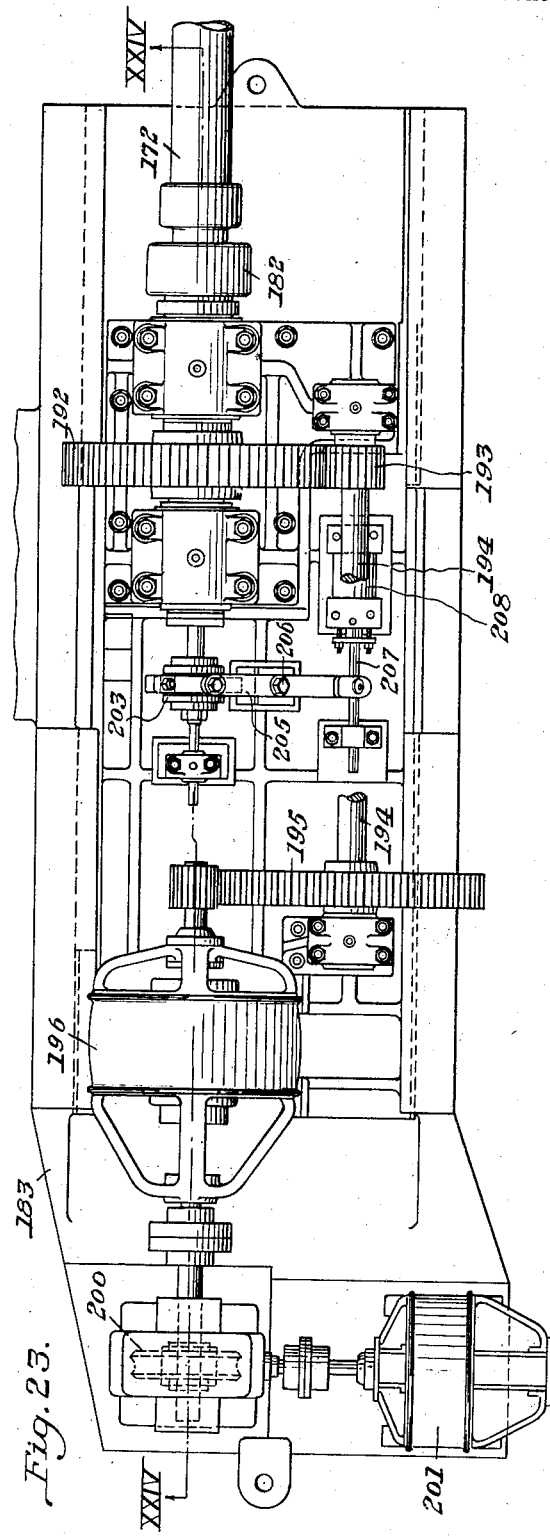
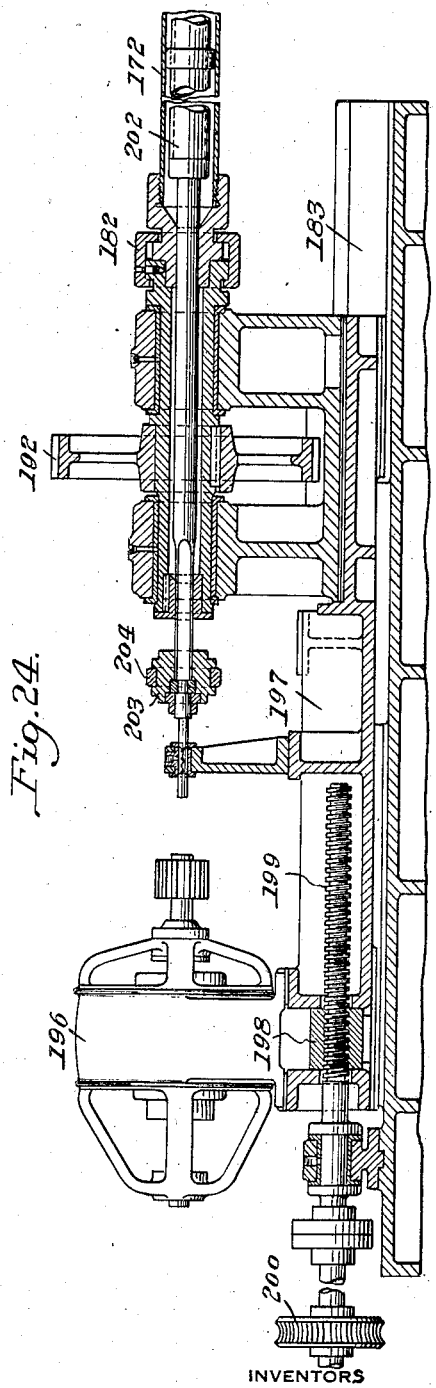
INVENTORS Patented Aug. 15, 1933

1,922,913

UNITED STATES PATENT OFFICE 1,922,913

APPARATUS FOR END-TO-END WELDING OF PIPE

John W. Free, Aliquippa, and Robert Anderson, Coraopolis, Pa., assignors to Jones & Laughlin Steel Corporation, Pittsburgh, Pa., a Corporation of Pennsylvania Application June 16, 1930. Serial No. 461,335

42 Claims. (Cl. 219—6)

This invention relates to a method and apparatus for the end-to-end welding of pipe. In various industrial applications of pipe, particularly pipe lines for oil and gas, it is desirable that the lengths of the pipe sections be as great as possible in order to reduce the number of field joints. So far as the user is concerned, the only practical limitation on the length of a pipe section is that imposed by shipping conditions. Unfortunately many pipe making processes and existing pipe making machines are limited in the length of their product. It is desirable, therefore, to weld pipe sections end-to-end before they leave the mill.

By the use of our invention pipe sections may be satisfactorily and accurately welded together in a minimum of time and at relatively low expense. The invention is herein described as embodied in a machine for welding pipe for relatively large diameter where the problems of handling are particularly acute.

We employ the flash method of welding wherein the two pipes to be welded are butted together and a welding current passed between them so as to heat up the ends to welding temperature. During this heating operation a part of the metal is burned away and the pipes must be fed together. After a desired heating period the current is turned off and the two pipes are pushed firmly together, bringing about the desired weld.

We preferably arrange the pipes to be welded in two sources of supply and feed a pipe from each source onto feed means such as troughed rollers. One pipe is preferably carried forward on its rollers until it is engaged by a stop which definitely positions the end of the pipe. The pipe is then gripped, the stop is retracted and the second pipe is fed forward until it engages the first pipe.

In machines for accomplishing the same general purpose as our machine it has been common practice to simply aline the pipes on suitable supports and then engage them at their rear ends for the "push up"; that is to say, for feeding them together during the heating and welding steps. It has also been common practice, after the welding is completed, to remove the devices engaging the outer ends of the pipes and feed the welded pipe axially out of the machine. This arrangement is open to numerous disadvantages. It is slow, particularly when dealing with pipes of varying length, and a large amount of time is lost in handling the pipes and setting the push up devices. It is also open to the objections that a large amount of factory space is required, and that it does not lend itself to the use of automatic or semi-automatic machines for the after operation of removing the flash. During the welding step a bead or flash is thrown up at the weld on both the outside and inside of the pipe. The outer flash may be readily chiselled off by workmen, particularly at the high temperature which persists at the joint for a short time after welding. But the inside flash is difficult to remove and requires the introduction of a long reamer.

We provide for discharging the pipe sidewise after the welding operation. It may be readily handled on skids and may be easily positioned and clamped for the after operation of reaming.

While the sidewise discharge removes a number of the difficulties attendant upon the use of devices engaging the pipe sections at their outer ends for pushing up, we prefer to grip the pipes adjacent the ends to be welded. The grips employed are preferably sufficiently wide and powerful as to insure alinement of the adjacent ends of the two pipes to be welded. It not infrequently happens that the pipes which are to be welded are not exactly straight, but by the use of grips such as we employ, the alinement of the pipes adjacent the weld is proper, thus insuring that there will be no sharp, abrupt bends at the point of weld, and making certain that even though the pipes fed to the machine are somewhat bent, the welded pipes can be straightened in a straightening machine.

A common defect in commercial pipes is the so-called "goose neck" which is imparted during manufacture. In making pipe by the lap-welding process, the leading end of the pipe, considering it as it passes through the welding rolls, is bent out of alinement with the main length of the pipe forming the so-called "goose neck". Where it is attempted to weld pipes having goose necks in a machine provided with backing-up devices engaging the upper ends of the pipes there is serious danger of mis-alinement in the welded product. This is due not only to lack of straightness in the pipe sections, but also due to the fact that the pipe ends are not exactly perpendicular to the ideal axis of the joined pipes, and consequently the very act of applying pressure through the backing up devices tends to bow the pipes further out of line.

These difficulties are all eliminated by the use of grips such as we employ. As a further precaution, however, the pipes are preferably fed so that the trailing ends thereof, considering them as they issue from the pipe welding rolls, are welded together. The grips are necessarily spaced a short distance apart so that the weld may be effected, and by using the relatively straight trailing ends of the pipe sections substantially perfect alinement is assured.

Since the grips must be powerful enough to positively aline the pipe sections despite any tendency to mis-alinement which might arise by reason of the pipes lying in the supporting rollers, it is necessary that they engage the pipe very firmly. For this reason we prefer to employ grips having hard steel working faces, and to use separate electrodes for establishing the welding circuit through the pipes. In order that adequate contact with the pipes shall be made, the electrodes are preferably arranged to "float" and adjust themselves to the pipe position as determined by the grips. The grips and the electrodes are both preferably opened and closed by fluid cylinders, and the cylinders for the electrodes are so arranged that the electrodes may move bodily. Each electrode is preferably made in sections, one section being movable toward or away from the pipe in the grips and the other sections being movable with the first section and also relative thereto. We prefer to use an electrode made in three sections, on one of which the other two sections are pivotally mounted. The first section is moved forward until it engages the pipe and then the other two sections are clamped on the pipe, embracing it substantially all around its circumference.

The grips and the electrodes are preferably actuated through a link and lever mechanism which balances the upper and lower grips and electrodes, thus materially reducing the effort required for opening and closing. This construction also provides a highly desirable construction in that the transformers for the welding current may be mounted between the operating levers for the upper and lower grips. In apparatus of this character it is important that the current path to and from the transformers be as short as possible, and with this arrangement it is possible to use extremely short leads and still have the transformers fully protected from the hot metal which flies during the heating step.

The machine is made in two halves, each half carrying the grips and the electrodes for a pipe which is to be welded. Hydraulic means is preferably employed for bringing the two halves together during the heating and welding steps and for separating them prior to a subsequent welding operation. Provision is further made for widely separating the two halves of the machine when necessary for inspection or repair. The device employed for this purpose is preferably separate from the hydraulic cylinder employed for the push up. It is particularly important that the effective force for pushing the pipe sections together be applied axially of the pipes in order to remove any tendency of the machine to spring and cause mis-alinement of the pipe sections. We therefore preferably employ two hydraulic cylinders, one above and one below the pipes.

The several controls for the machine are largely concentrated in the hands of one operator. This insures high speed in operation with a minimum of errors. Further, we position these controls so as to put the operator in a position to observe the entire operation and, at the same time, keep him out of the way of the pipes being handled. The controls are mounted in a pulpit on top of one of the machine halves. From this position the operator can view the process without difficulty and, at the same time, he is out of the way of the material and there is no danger of being struck by flying hot metal.

In the accompanying drawings, illustrating the present preferred embodiment of our invention, Figure 1 is a diagrammatic view illustrating the several steps in the process;

Figure 2 is a top plan view of the machine;

Figure 3 is a control diagram;

Figure 4 is a view to enlarged scale showing the operator's pulpit;

Figure 5 is a view to enlarged scale of a portion of Figure 2, showing the welding zone of the machine and adjacent mechanism;

Figure 6 is a transverse view taken on the line VI—VI of Figure 5;

Figure 7 is a similar view taken on the line VII—VII of Figure 5;

Figure 8 is a similar view taken on the line VIII—VIII of Figure 5;

Figure 9 is a sectional view to enlarged scale of the drive mechanism for the trough rollers and also showing the means for raising and lowering such rollers;

Figure 10 is an end elevation, partly broken away, of the supporting skids for the pipes, the troughed rollers and the apparatus for controlling the movement of the pipes on the skids;

Figure 11 is a continuation of Figure 10;

Figure 12 is a top plan view of the welding machine proper;

Figure 13 is a longitudinally vertical section taken on the line XIII—XIII of Figure 12;

Figure 14 is a transverse vertical section taken on the line XIV—XIV of Figure 12;

Figure 15 is a similar section taken on the line XV—XV of Figure 12;

Figure 16 is a longitudinally vertical section taken on the line XVI—XVI of Figure 12;

Figure 17 is a view to enlarged scale of the stop mechanism for positioning a pipe to be welded;

Figure 18 is a vertical section, partly broken away, taken on the line XVIII—XVIII of Figure 17;

Figure 19 is a section through the welded pipe showing the flash and indicating the flash reamer;

Figure 20 is a vertical section showing the gripper for holding the pipe during the reaming operation;

Figure 21 is a top plan view of the reaming machine;

Figure 22 is a side elevation thereof;

Figure 23 is a view to enlarged scale of a portion of Figure 21; and

Figure 24 is a vertical section on the line XXIV—XXIV of Figure 23.

The general construction and operation of the machine will first be described and the several elements thereof will then be considered in detail.

GENERAL CONSTRUCTION AND OPERATION

See particularly Figures 1, 2, 3 and 4.

The pipe to be welded are supplied from two stations, indicated at $S^1$ and $S^2$, and are fed forward one at a time, as indicated by arrows $a1$ and $a2$, onto trough rollers $R^1$ and $R^2$. The pipe are supported in the stations $S^1$ and $S^2$ on skids 2 and their movement onto the rolls is controlled by pipe-feed cylinders 3 under the control of an operator in a pulpit P on top of the machine.

The pipe on the rolls $R^1$ is fed in the direction of the arrow $a3$ into engagement with a stop 4.

The stop 4 is a disc on the head of a piston 5 movable in a cylinder 6, so that the leading end of the pipe on the rolls $R^1$ will be engaged by the stop 4 when it reaches the welding zone Z. The rolls $R^1$ are motor driven and their movement is under the control of the operator in the pulpit. When the pipe is engaged by the stop 4, the motor for operating the rolls $R^1$ is stopped, the pipe is gripped as hereinafter described, and the stop 4 is then retracted. It is necessary to feed the pipe on the rolls $R^2$ forward until its end strikes the end of the pipe which has been fed forward by the rolls $R^1$. In order to prevent interference by the cylinder 6, this cylinder is moved out of alinement with the pipe by means of a piston 7 in a cylinder 8.

When the pipes have been brought together with their ends in abutting relationship, the second pipe is engaged by its grips. The grips are indicated generally by the reference letter G. These grips are sufficiently wide and powerful to insure alinement of the inner ends of the two pipes despite any curvature in the pipes generally. The gripped pipes are then engaged by electrodes E and welding current is applied. The current heats up the butting pipe ends, burning away a part of the metal. During this time the grips for the two pipe sections are brought steadily together to compensate for the burning away of the metal. After the proper welding temperature has been reached the current is turned off and the pipes are pushed together to bring about the weld.

When the weld has been completed the grips and electrodes are opened and the pipe is lifted out of the rollers $R^1$ and $R^2$ by arms 9 actuated by a kick-off cylinder 10 under the control of the operator in the pulpit. The welded pipe rolls onto skids 11 and the flash on the outside is chipped off by hand, although if desired an automatic chipping means may be employed. The pipe is rolled across the skids 11 until it is in position to be engaged by a gripper indicated generally by the reference character 13, and while it is thus gripped and alined, a reamer, indicated generally by the reference character 14, is fed in to remove the inside flash. The movement of the pipe across the skids 11 is limited by arms actuated by a pipe stop cylinder 15, which arms check the sidewise movement of the pipe in such position as to permit of its being engaged by the gripper 13. After the reaming operation, the pipe is preferably blown out by means of an air nozzle indicated at 12, after which it is fed off the skids 11 into one of two cradles $x^1$ and $x^2$ where a number of pipes can be picked up by the crane and taken away.

As shown in Figure 2 the machine consists of two halves indicated by the reference characters 20 and 21. The right half 20 is fixed and the left half 21 is movable toward or away from it. The two halves are normally urged apart a short distance by hydraulic cylinders 22 (see Figure 3) and may be moved together by means of hydraulic cylinders 23. The grips G are operated by cylinders 24R and 24L and the electrodes E are actuated by cylinders 25R and 25L. The transformers for the welding current are illustrated at 26.

The rolls $R^1$ are all mounted on a frame 27L, and the rolls $R^2$ are mounted on a similar frame 27R. The rolls $R^1$ are driven through mitre gears 28, a shaft 29 and gearing 30 by a motor 31L. The rolls $R^2$ are similarly driven by a motor 31R. In order to accommodate pipes of different sizes, it is necessary to adjust the frames 27L and 27R vertically, and this is accomplished through mechanism, hereinafter described in detail, by a motor 32.

*Control mechanism*

The control mechanism is best shown in Figures 3 and 4 and the several controls will be described in the order in which they are actuated by the operator in welding two pipe sections.

The pipe feed cylinders 3, which are double acting, are first supplied with air so as to cause the feeding of a pipe from each of the stations $S^1$ and $S^2$ onto the rollers. This is effected by a control valve $C^1$ connected to the cylinders through air pipes 33 and 34. Air under pressure is fed from a pipe line 35 through a branch 36 having a lead 37 extending to the valve $C^1$.

With the pipes thus placed on the rollers $R^1$ and $R^2$ the stop advancing and retracting cylinder 6 is moved into position to engage the pipe by causing lowering of the piston 7 in the cylinder 8. This is effected by actuating a control valve $C^2$ which is supplied with air under pressure from the supply pipe 35. After the stop cylinder 6 has been lowered the stop is advanced by actuating a valve $C^3$.

The pipe on the rollers $R^1$ is now fed forward by energizing the motor 31L. This is done by a control switch $C^4$. After the pipe has been advanced to engage the stop 4, the current to the motor 31L is shut off, the control valve $C^3$ is reversed in position so as to cause retraction of the stop 4 and the control valve $C^2$ is then reversed in position to lift the cylinder 6 out of alinement with the pipe.

This pipe is next gripped by supplying air to the cylinder 24L. The supply of air to the grip cylinder 24L is controlled by a valve $C^5$, which is connected to a pipe 38 supplying high pressure air.

The pipe on the rolls $R^2$ is now fed forward by energizing the motor 31R. The motor 31R is controlled by a switch $C^6$. Rotation of the rolls $R^2$ feeds the pipe forward until it abuts the pipe in the grips on the left-hand side of the machine. The right-hand grips are now closed by supplying air to the cylinder 24R. The supply of air to this cylinder is controlled by a valve $C^7$. The electrodes are now moved into engagement with the pipes by actuating the electrode cylinders 25L and 25R. The supply of air to these cylinders is controlled by a valve $C^8$ which is supplied with air from a pipe 39.

The welding current is now turned on, it being controlled by a switch $C^9$. After the metal heats up the two machine halves are brought together by supplying fluid under pressure from a pipe 40 to the hydraulic cylinders 23. The supply of fluid to the cylinder 23 is controlled by a valve $C^{10}$. After the metal has reached the welding temperature the current is shut off and the valve $C^1$ is opened wide so as to rapidly push the two pipe sections together and bring about the weld.

After the weld has been completed the electrodes and the grips are opened by actuating the controls $C^5$, $C^7$ and $C^8$, thus freeing the welded pipe and leaving it supported by the rollers $R^1$ and $R^2$. A control valve $C^{11}$ is then actuated to supply air from the pipe 35 to the kick-off cylinder 10 actuating the arms 9 to lift the welded pipe out of the rollers and onto the skids 11.

The control valve $C^{10}$ is moved to position to disconnect the hydraulic cylinders 23 from the supply pipe 40 and to exhaust the fluid therein.

The cylinders 22 are permanently connected to the supply pipe 40 by a branch pipe 41. These cylinders 22 are over-balanced, and the machine halves are caused to move together. However, when the cylinders 23 are exhausted, the pressure in the cylinders 22 is sufficient to again separate the machine halves and put them in position for another operation.

The welded pipe is fed across the skids 11 to a point where it can be engaged by the gripper 13 for reaming. The outside flash is there chipped off and the pipe is then moved to the dotted line position of Figure 1 where it is blown out.

The grip cylinder for the reamer is indicated at 42 in Figure 3, and the operation of the cylinder is controlled by a reamer grip control $C^{12}$. The controls for the reamer are indicated in Figure 3 but will be described in detail in connection with the description of the reaming apparatus.

PIPE TRANSFERRING MECHANISM

See particularly Figures 2 and 5 to 11 inclusive.

The pipes to be welded are fed from the skids 2 to the rolls R by means of arms 50 carried on rock shafts 51. There is a rock shaft at each side of the welding machine proper, each having its actuating cylinder 3. The actuating cylinders 3 are trunnioned, as indicated at 52 (see Figure 10) and their piston rods are connected to the rock shafts by arms 53. The movement of the arms 50 is limited by a slotted link 54.

When the arms 50 are lowered to the dot-and-dash line position of Figure 10, the pipes on the skids 2 tend to roll forward so as to push one pipe over the arms. Each arm is provided with a spur 55 which moves upwardly between pipes on the skids so as to insure the feeding of a single pipe onto the rolls R. The leading pipe is lifted upwardly as the arms 50 move to the solid line position of Figure 10, and when the arms are in such position their top faces are sufficiently inclined to cause this pipe to roll onto the rollers R. The end faces 56 of the arms 50 hold back the other pipes on the skids.

The lifting of a pipe from the supply station in order to feed it onto the rollers is particularly desirable because it insures separation of the pipes one at a time from the large number which may be present on the skids and insures that a pipe on the rolls R will not be interfered with by an other pipe rolling against it.

After the pipes on the rolls R have been fed together and welded as above described, the arms 9 must be actuated by the kick-off cylinder 10 to lift the welded pipe out of the rollers and transfer it onto the skids 11. The arms 9 are carried on shafts 60L and 60R, there being a shaft 60 at each side of the welding machine proper. It is not desirable to use a single shaft extending all the way across the apparatus as the same would interfere with the grips and also be in the way of the workmen chipping the flash or otherwise engaged around the machine. The piston rod 61 of the kick-off cylinder 10 carries a cross-head 62 (see Figure 7), which cross head is connected by links 63 to arms 64 on the shaft 60R. A spring cushioning device 65 is provided on the piston rod 61 so as to eliminate shocks. It is desirable that all the arms 9, regardless of which side of the machine they may lie on, be actuated at the same time, and the shafts 60R and 60L are therefore operated by a single kick-off cylinder 10 and are connected by a linkage which provides a free working space around the welding machine proper.

The connecting means is best shown in Figures 5 and 6. Each shaft 60L and 60R carries a lever 66. The levers 66 are connected by links 67 to levers 68 on a shaft 69. The shaft 69 extends in front of the welding machine proper, and, being close to the foundation of the machine, is not in the way.

The shafts 60L and 60R also actuate stop levers $9^S$ (see Figure 8). The levers $9^S$ are loosely mounted on the shafts 60R and 60L. These shafts carry arms $66^a$ connected through links $66^b$ to bell cranks $66^c$. Each bell crank is connected through a link $66^d$ to the stop lever $9^S$. When the kick-off arms 9 are in their lowermost position, the stop arms $9^S$ are in the elevated position of Figure 8 and prevent pipes from rolling across the troughed rollers $R^1$ and $R^2$ as they are fed from the supply stations. When the kick-off arms 9 are raised the linkages just described are effective for lowering the stop arms $9^S$ to permit the sidewise discharge of the pipe.

It will be noted from Figures 6 and 7 that the kick-off cylinder is mounted on the frame 27R and that the shafts 60L and 60R are journalled on brackets 70 extending sidewise from the frames 27L and 27R, which brackets also carry the shafts 29 for actuating the rollers $R^1$ and $R^2$. The entire kick-off mechanism therefore moves up and down when the table rollers 9 are adjusted vertically to accommodate pipes of different sizes. The mechanism for adjusting the frames 27L and 27R and the rollers R, carried thereby, is best shown in Figures 2, 5 and 9. The motor 32 is connected through gearing 71 (see Figure 5) to a shaft 72. The shaft 72 drives worm shaft 73 through mitre gears 74. The worm shafts carry worms 76 engaging worm teeth 77 formed on nuts 78 engaging jack screws 79. The frames 27L and 27R are carried on the jack screws 79, and operation of the motor 32 in one direction or the other is effective for raising or lowering the rolls R to any desired position.

The shafts 60L and 60R have supporting arms 80 loosely mounted thereon. The supporting arms 80 have forked ends 81 engaging pins 82 formed on the sides of the skids 11. This provides a continuous support for the pipes as they leave the arms 9 regardless of the vertically adjusted position of the rollers $R^1$ and $R^2$.

The movement of the pipes across the skids 11 is controlled by a pipe stop cylinder 90 mounted in trunnions as indicated at 91 (see Figure 10). The pipe stop cylinder is controlled by a valve $C^{13}$ connected to the air pipe 36 and having control pipes 92. When the piston of the cylinder 90 is urged upwardly, the piston rod which is connected to an arm 93 on a shaft 94 rotates the shaft counter-clockwise, as viewed in Figure 10. The movement is limited by a slotted link 95. The shaft 94 carries arms 96 connected to links 97. The links 97 are pivotally connected to stops 98 and 99. The stops, in turn, are pivotally mounted on the skids 11. In the position shown in Figure 10 the pipe $p^1$ is held in the dot-and-dash line position of Figure 1, and the pipe $p^2$ is held in position to be engaged by the grippers 13. When the piston of the cylinder 90 is moved to its lowermost position, the stops 98 and 99 are rotated clockwise so as to leave the pipe free to roll across the skids 11 onto skids 100. The movement of the pipes across the skids 100 is checked by stops 101 which hold the pipe stationary until it is finally inspected and marked. The stops 101 are then lowered and the pipe rolls into the cradle X¹. If it is desired to feed the pipe across the cradle X¹ to the cradle X², a series of arms 102 is lowered to form extensions of the skids 100. The pipes are picked up from the cradles X¹ and X² by the crane and taken away.

The welding machine proper

See particularly Figures 2 and 12 to 16 inclusive.

As above stated the two machine halves 20 and 21 are relatively movable. The machine half 20 is secured to the foundation and is provided with sidewise extending bed rails 110 insulated from the machine half 20 as shown at 111. The machine half 21 is slidable on the rails 110. The main frame members for each half of the machine accommodate bearing pins 112 for the main levers which operate the pipe grips. The grip construction is best shown in Figure 14.

Pipe grips

The grips proper are mounted on a plate 113 secured to an upstanding portion 114 of each of the main frame castings. A stationary jaw 115 is formed on the plate 113 and cooperating jaws 116 and 117 are pivotally mounted thereon at 118. Each jaw is provided with removable working faces 119 to take care of wear, or which may be replaced by other inserts to accommodate pipes of another size. The jaw 116 swings upwardly to open, and the jaw 117 swings downwardly. Each jaw is provided with an operating link 120 by which the upper jaw 116 is connected to an operating lever 121, and the lower jaw 117 is connected to an operating lever 122. These levers are pivoted on the pins 112. The levers 121 and 122 extend rearwardly of the machine and are connected to a slide block 123 by toggle links 124. The slide block 123 is guided in ways 125 on the frame of the machine.

It will be seen from the above described construction that the jaws and their operating mechanism are balanced so that they may be operated with a minimum of effort. Opening and closing of the jaws is effected by moving the slide block 123. A piston rod 126 is provided for each slide block 123, the piston rods carrying pistons 127 in the grip cylinders 24L and 24R. In Figure 14 the solid lines show the grips in closed position while the dot and dash lines show them in open position.

When a pipe is fed into the grips by the rollers R¹ or R², the jaws 116 and 117, when closing, force the pipe against the fixed jaw 115. Since the jaws on the two halves of the machine are accurately alined, the pipes are alined with corresponding accuracy, and since the grips are made relatively wide, the adjacent ends of the two pipes are properly positioned even though there is some curvature in the pipes. In short, the grips are sufficiently powerful to overcome any tendency to mis-alinement occasioned by the support normally afforded the pipes by the rollers R¹ and R².

The grips are sufficiently wide to obtain the desired alinement. We have found that grips 12 inches in width are satisfactory for pipes up to 12¾ inches outside diameter. Preferably the grips have an effective width substantially equal to or greater than the diameter of the pipes being handled.

Electrodes

The construction and operating connections for the electrodes are best shown in Figure 15. Each half of the machine carries brackets 130 and 131 in which a piston rod 132 is slidably mounted. The piston rod 132 carries a head 133 which carries an insulated bracket 134. An electrode 135 projects outwardly from the bracket 134 and cooperating electrodes 136 and 137 are pivoted on the bracket at 138. The electrodes 135, 136 and 137 are all provided with removable working portions 139 to take care of wear and to permit of replacement with inserts of other sizes for handling different sized pipes.

Each of the electrodes 136 and 137 is provided at its outer end with a link 140. The links 140 are made in two pieces separated by an insulated disc 141. The links 140 are connected to actuating levers 142 pivoted on the frame of the machine at 143. The levers 142 extend rearwardly from their pivot points and are provided with toggle arms 144 connected to a cylinder block 145. The cylinder block is not fixed in position but is free to move back and forth on the piston rod 132. A piston 146 is secured to the piston rod 132 and works inside the cylinder block 145. At its rear end the piston rod 132 is bored to receive a spring 147 and a block 148 which cushions the movement.

The electrodes are shown in closed position by solid lines in Figure 15, while the dot-and-dash lines show the electrodes 136 and 137 open.

It will be seen that the piston rod 132 may be moved back and forth a short distance to permit the electrode 135 to accommodate itself to a pipe which is held by the gripping jaws. When air is introduced to the right-hand end of the cylinder 145, the air pressure tends to move the piston 146 to the left-hand end of the cylinder. As a result the electrode 135 moves forward into firm engagement with the pipe and carries the electrodes 136 and 137 forward with it. When the forward movement of the electrode 135 is checked by engagement with the pipe, the cylinder 145 then moves to the right, straightening out the toggle arms 144 and effecting closing of the electrodes 136 and 137 through the linkage above described. When air is introduced to the left-hand end of the cylinder 145, the electrodes 136 and 137 are opened and the electrode 135 is retracted.

By reason of the floating construction for the electrodes adequate contact with the pipe is assured. At the same time the copper facings of the electrodes are not subject to undue wear, such as would occur if it were attempted to exert heavy gripping pressure therethrough.

Location of transformers

The position of the transformers 26 is best shown in Figures 14, 15 and 16. In apparatus of this character it is important that the electrical path be as short as possible. At the same time the transformers must be protected from the hot metal which flies when the pipes are being heated up. The main frame members of the machine halves 20 and 21 provide platforms 150 on which the transformers may be mounted, and the upwardly extending frame portions 114 provide shields which protect the transformers from the hot metal. The operating levers for the grips and electrodes are spaced a sufficient distance apart to accommodate the transformers and to permit of their being placed very close to the welding zone. This greatly simplifies and improves the electrical connections for the machine.

Push-up mechanism

The push-up mechanism is best illustrated in Figure 13.

The movable half 21 of the machine is provided with insulating bushings 151 to accommodate piston rods 152. The piston rods are provided with collars 153 and nuts 154 which hold the rods in place. The piston rods extend through openings 156 in the stationary half 20 of the machine and have integral piston heads 157 formed thereon. The piston heads 157 lie in the push-up cylinders 23, which cylinders are secured to extensions 158 on the fixed half 20 of the machine. The piston rods have extensions 159 beyond the heads 157 which form plungers in the cylinders 22. The cylinders 22 are held in fixed position relative to the fixed half 20 of the machine by rods 160.

The machine halves are normally urged apart by fluid pressure in the cylinders 22, which pressure exerts a thrust on the piston rods 152 and causes the movable half 21 of the machine to move to the left as viewed in Figure 13. The stroke is limited by the pistons 157 engaging the ends of the cylinders 23. When fluid pressure is applied to the cylinders 23, the constant pressure on the plunger 159 is overbalanced and tension is exerted on the rods 152 to pull the machine halves together. The rate of admission of fluid to the cylinders 23 is carefully controlled by the operator who manipulates the control $C^{10}$ so as to bring the machine halves together relatively slowly during the heating operation, and then rapidly to form the weld.

The axis of the pipes being welded is indicated at A in Figure 13. It will be noted that the cylinders 23 are placed one above and below the axis A—A and equally spaced therefrom so that no eccentric loading is applied to the grips during the push up. This is important in attaining accurate alinement.

Pipe Stop

See particularly Figures 17 and 18.

The pipe stop 4 is, as above described, mounted on a piston 5 movable in a cylinder 6. The cylinder 6 is formed on a bracket 161 rockable on a pin 162 carried in brackets 163 secured to the plate 113 on the stationary half 20 of the machine. Figure 18 shows the cylinder 6 lowered into position so that the stop 4 may engage a pipe fed into the welding zone by the rolls $R^1$. After this pipe has been positioned, the bracket 161 is swung around its pivot pin 162 to the dotted line position of Figure 18 so as to take it out of the way. The movement of the bracket 161 is controlled by the piston 7 and its cylinder 8. The cylinder 8 is trunnioned at 164 on a bracket 165, and the rod of the piston 7 is pivotally connected to the bracket 161 at 166. When air is introduced to the lower end of the cylinder 8, the piston moves upwardly to carry the bracket 161 to the dotted line position of Figure 18. When air is introduced to the upper end, the bracket 161 is swung downwardly until a collar 167 engages an adjustable stop 168.

The rod of the piston 7 extends through the upper end of the cylinder 8 to carry the collar 167, and the stop 168 is carried on studs 169 projecting from the upper head of the cylinder 8. The studs 169 carry nuts 170 which may be employed to hold the stop 168 in any adjusted position. This adjustment is desirable because, as best shown in Figure 17, the stop 4, when in position to engage a pipe fed inwardly by the rolls $R^1$, extends between the jaws and the electrodes on the fixed half of the machine. It is necessary that the head 4 clear the grips of the electrodes and yet engage the wall of the pipe.

Flash Reamer

See particularly Figures 3 and 19 to 24 inclusive.

When the two pipes have been welded together the joint shows an outer flash $F^1$ and an inner flash $F^2$ (see Figure 19), both of which must be removed. The outer flash is preferable chipped off by workmen, but the inner flash must be reamed out. The reaming is effected by an expansion reamer indicated at 171 in Figure 19 and carried on a reamer rod 172. Prior to reaming the pipe is gripped and aligned by the grippers 13. The gripping mechanism is shown in section in Figure 20. It comprises gripping jaws 172 having inserts 174 which may be changed to accommodate pipes of different sizes. The jaws 173 are pivoted at 175 and are provided with operating links 176. The links 176 are pivoted to a cross head 177 working in guides 178 on a frame member 179. The cross head 177 is connected to a piston 180 working in the grip cylinder 42. When air pressure is applied to the cylinder 42 the grips are moved to the solid line position of Figure 20, but when the pressure is released the grips open as shown by dot and dash lines. When the grips are in this position they lie below the skids 11 and permit of sidewise movement of the pipes.

The general construction of the reamer is shown in Figures 21 and 22. It is necessary to feed the reamer head into the zone of the flash which is to be removed. Since the pipes are relatively long, and since the feed employed during the reaming operation is relatively slow, it is desirable to provide a special means for rapidly advancing the reamer head until it is in the zone of the flash while it is still red hot. This becomes particularly important where a high output is desired.

It is not ordinarily feasible to employ a single mechanism for advancing the reamer head into the zone of the flash and for rapidly feeding the reamer during the cutting movement. If it is attempted to do this by speed control of a driving motor, difficulties are encountered because of the wide speed variation which becomes necessary. We therefore employ one motor for advancing the reamer head to the zone of the flash and another motor for feeding the reamer head during the cutting away of the flash.

The reamer rod 172 extends over a supporting roller 181 and is connected to a rotatable head 182 mounted on a carriage 183. The carriage runs on tracks 184 and is moved back and forth by a cable 185. The cable is connected to the front of the carriage 186 and extends forward over a sheave 187, then backward around a cable drum 188 and is then dead-ended at the rear of the carriage 183 as shown at 189. The cable drum 188 is driven through gearing 190 by a motor 191. The motor is controlled by a control $C^{14}$ (see Figure 3) and is rotated in one direction or the other so as to rapidly advance or retract the reamer head.

The mechanism for imparting the desired motions to the reamer head is best shown in Figures 23 and 24. The head 182 to which the reamer rod 172 is connected carries a gear 192 meshing with a pinion 193 on a shaft 194. The shaft 194 is driven through gearing 195 by a motor 196. The motor 196 is controlled by a switch $C^{15}$ (see Figure 3).

The motor 196, the head 192 and the connecting gearing are all mounted on a slide 197 movable on the carriage 183. A nut 198 is secured to the slide 197 and this nut is traversed by a screw 199. The screw is driven through worm gearing 200 by a motor 201. A controller $C^{16}$ (see Figure 3) is provided for the motor 201. When the motor 201 is rotated in one direction it advances the slide 197 and provides the relatively slow cutting feed for the reamer head. When the motor 201 is rotated in the other direction it retracts the slide 197 perpendicularly to a reaming operation on a succeeding pipe.

The reamer head 171 is of a well known type and its cutters are expanded by the axial movement of a push rod 202 inside the reamer supporting rod 172. The push rod 202 carries a flanged spindle 203 for a link 204. A yoke 205 is connected to the link 204. The yoke is pivoted at 206 and is connected to the piston rod 207 of an air cylinder 208. The air cylinder 208 is connected by flexible hose 209 (see Figure 3) to pipes 210 leading to a control valve $C^{17}$ which is connected to the air pipe 36. By manipulating the control valve $C^{17}$ air can be admitted to either end of the cylinder 208, thus advancing or retracting the push rod 202 and expanding or retracting the cutting blades on the reamer head 171.

By the mechanism above described the reamer head may be rapidly advanced into the zone of the flash and thereafter fed relatively slowly forward by the motor 201 so as to cut the flash from the inside of the pipe. As soon as the cutting has been completed the reamer head is rapidly retracted, after which the pipe is freed from the grips 13 and advanced across the skids 11.

SEPARATION OF MACHINE HALVES FOR INSPECTION AND REPAIR

See particularly Figures 5, 13 and 16.

A desirable feature of our machine is that the two halves may be widely separated if it is desired to inspect, repair or adjust it. Separation of the two halves may be readily effected by removing the nuts 154 (see Figure 13) and the conductors 26ª (see Figure 16). Fluid pressure may then be applied to a cylinder 211 whose piston rod 212 is connected to a bracket 213 on the movable half 21 of the machine. When it is desired to bring the two halves of the machine together again air is admitted to the left-hand end of the cylinder 211. The supply of air to the cylinder 211 is controlled by a valve $C^{18}$ (see Figure 3).

Figure 5 shows in dot-and-dash lines the mechanism for the grips and electrodes when the machine halves have been separated. It will be noted that the innermost of the rollers $R^1$ is spaced well back from the welding zone so as to permit of the separation of the two machine halves. In order to afford support for the inner end of a pipe supplied from the station $S^1$ a supplemental idle roller $r^1$ is provided. This roller is mounted on the bracket 214 which is pivoted to the frame 27L at 215. When it is desired to separate the two halves of the machine the bracket 214 is swung to the dot-and-dash line position of Figure 5.

We have illustrated and described a present preferred embodiment of the invention. It will be noted, however, that it is not limited to the forms shown but may be otherwise embodied or practiced within the scope of the following claims.

We claim:

1. Apparatus for making welded pipe comprising spaced supply stations, means for feeding pipes singly and successively from a station and into alinement with a pipe fed from the other station, means for causing relative endwise movement between the pipes so as to butt their ends, means for welding the abutted ends, and means for discharging the welded pipe sidewise.

2. Apparatus for making welded pipe comprising spaced supply stations, conveyors having alined feed rolls for receiving pipes from the stations, means for supplying pipes singly from the stations to the feed rolls, means actuating the feed rolls for causing relative movement of the pipes to bring the ends into abutting relation, means for welding the abutting ends of the pipes, and means for moving a welded pipe sidewise off the feed rolls.

3. Apparatus for making welded pipe comprising grips having an opening to receive a pipe, means for supporting a pipe and advancing it into position to be engaged by the grips, and means for adjusting the supporting means toward or away from the axis of the grip opening.

4. A pipe welding machine including a pair of pivoted jaws, horizontally extending levers, links connecting the levers to the jaws, toggle links connecting the levers, and means for actuating the toggle links.

5. A pipe welding machine comprising a welder, a supply station, a conveyor for moving pipes longitudinally to the welder, means for feeding pipes sidewise onto the conveyor, and means for discharging welded pipe in a sidewise direction only from the conveyor.

6. A pipe welding machine comprising a welder, a supply station, a conveyor for moving pipes longitudinally to the welder, means for feeding pipes sidewise onto the conveyor, stop means for limiting the sidewise movement of a pipe when fed onto the conveyor, and means for discharging welded pipes sidewise from the conveyor.

7. A pipe welding machine comprising a welder, a supply station, a conveyor for moving pipes longitudinally to the welder, means for feeding pipes sidewise onto the conveyor, stop means for limiting the sidewise movement of a pipe when fed onto the conveyor, means for discharging welded pipes sidewise from the conveyor, and connections between the stop means and the discharge means for moving the stop means out of the way when it is desired to discharge a pipe.

8. A pipe welding machine comprising a welder, a conveyor at each side thereof, and means for sidewardly discharging a welded pipe extending across the two conveyors.

9. A pipe welding machine comprising a welder having spaced electrodes, means for feeding a pipe into position to be engaged by an electrode, stop means for determining the position of the pipe, and means independent of the electrode for holding the pipe in position.

10. A pipe welding machine comprising a welder having spaced electrodes, means for feeding a pipe into position to be engaged by an electrode, stop means for determining the position of the pipe, means independent of the electrode for holding the pipe in position, and means for retracting the stop means.

11. A pipe welding machine comprising a welder having spaced electrodes, means for feeding a pipe into position to be engaged by an electrode, and stop means extending past the other electrode for determining the position of the pipe.

12. A welding machine comprising frame members, means carried by each frame member for gripping a pipe, means for effecting relative movement of the frame members through a relatively narrow range, and independent means for moving the frame members relatively widely apart.

13. A welding machine comprising frame members movable relatively widely apart, means carried by each frame for gripping the pipe, and independent means for effecting relative movement of the frame members through different ranges.

14. A welding machine comprising frame members, means on each frame member for gripping the pipe, the frame members being relatively movable in a direction axially of the gripped pipes, and means disposed symmetrically about the pipe for moving the frame members together, said means exerting a resultant effective force substantially along the axis of the pipes.

15. Apparatus for making welded pipe comprising spaced pipe supply stations, a welder therebetween, means for feeding pipe singly and successively from said stations, means for supporting the pipes in alinement, means for causing relative endwise movement between the pipes so as to butt their ends, and means for discharging welded pipe sidewise of the apparatus.

16. Apparatus for making welded pipe comprising spaced supply stations for pipes, welding means therebetween, a shiftable extensible stop adjacent said welding means, means for feeding a pipe from a supply station against the extended stop, means for retracting and shifting the stop, and means for feeding a pipe from the other supply station into abutting relation with the first-mentioned pipe.

17. Apparatus for making welded pipe comprising means for moving a pipe endwise, a welder, a stop at one side of the welder for positioning the pipe relative to the welder, means for shifting and extending the stop to operative position and subsequently withdrawing it, and means for bringing another pipe into endwise abutting relation with the positioned pipe.

18. Apparatus for making welded pipe comprising means for moving a pipe endwise, a stop in the path of the moving pipe for positioning the pipe, grippers for holding the pipe in the position determined by said stop, means for removing the stop, means for bringing another pipe into endwise abutting relation with the positioned pipe, and means independent of the grippers for welding the pipes.

19. Apparatus for making welded pipe comprising means for moving a pipe endwise, a stop in the path of the moving pipe for positioning the pipe, means for gripping the positioned pipe, stop-removing means, means for bringing another pipe into endwise abutting relation with the positioned pipe, means for gripping the second pipe, and independent means for welding the pipes together.

20. A pipe welding machine comprising welding electrodes, a vertically extending frame member lying to one side of the electrodes, grips for engaging a pipe adjacent the electrodes, spaced levers operatively connected to the grips, and welding means including a transformer, the transformer lying between the levers and behind the frame member.

21. A pipe welding machine comprising pivoted levers having grips for holding a pipe in fixed position, and electrodes for embracing the pipes in the grips, the electrodes being freely movable so they may adjust themselves to the position of a pipe in the grips.

22. A pipe welding machine comprising grips, pivoted levers having an electrode for engaging a pipe in the grips, means for moving the electrode against the pipe, and a cooperating electrode movable with the first-mentioned electrode and also movable relative thereto.

23. In an apparatus for welding pipes end to end, means for supplying a pipe in position for welding, hinged gripping jaws for seizing the pipe and hinged electrodes for engaging the pipe, said jaws and electrodes being openable for free lateral discharge of a welded pipe.

24. In an apparatus for joining pipe end to end, fixed and movable portions, each having independent grips and electrodes for engaging a pipe end, connections including insulated joints from the fixed portion to said movable portion, and means for actuating said connections to shift the movable portion relative to the fixed portion.

25. Apparatus for making welded pipe comprising gripping jaws, means for moving a pipe endwise to bring its end between said jaws, means for moving a second pipe in substantial axial alinement with the first pipe so as to abut their ends, means for welding said pipes while in abutting relation, and means for discharging the welded pipe sidewise therefrom.

26. Apparatus for making welded pipe comprising means for moving the pipe endwise, welding electrodes movable relative to said means for engaging a pipe thereon, a stop adjacent said means for positioning the pipe relative to the electrodes, means alined with said first-mentioned means for bringing another pipe into endwise abutting relation with the first-mentioned pipe, and means extending between portions of said means for discharging a welded pipe sidewise from said electrodes.

27. Apparatus for making welded pipe comprising spaced supply stations, alined feed rolls adjacent said stations for receiving pipes therefrom, means for supplying pipes singly from the stations to the feed rolls, stops adjacent said rolls for preventing pipes from rolling off said rolls, means actuating the feed rolls for causing relative movement of the pipes to bring the ends into abutting relation, and means for welding the abutting ends of the pipes.

28. Apparatus for making welded pipe comprising spaced supply stations, alined roll tables adjacent the stations for receiving pipes from the stations, means for supplying pipes singly from the stations to the tables, means actuating the table rolls for causing relative movement of the pipes to bring the ends into abutting relation, grips engaging the pipes adjacent their abutting ends and effective for alining them, and means independent of said grips for welding the abutting ends of the pipes.

29. A machine for welding pipes end to end comprising alined roll tables for supporting the pipes during welding, means between said tables for welding together the ends of said pipes while the pipes are supported on the roll tables, said welding means including openable electrodes and jaw grips independent of the electrodes, pivoted on horizontal axes for engaging the pipes adjacent their ends.

30. A pipe welding machine comprising means for supporting pipe lengths in end to end abutting relation, electrodes engageable with said pipe lengths adjacent the plane of contact therebetween, a transformer adjacent said electrodes and connected thereto, a pair of pivoted gripping jaws for engaging one of said lengths, levers connected with said jaws for actuating them, and a toggle linkage for operating said levers to close the jaws.

31. A pipe welding machine including alined conveyors for supporting pipe lengths in end to end relation, welding electrodes engageable with said lengths adjacent their plane of contact, and means adjacent said conveyors for lifting and tilting a pipe length thereon whereby it is discharged laterally thereof.

32. A pipe welding machine including welding electrodes, conveying means for a pipe to be welded, a movable stop in the path of movement of the pipe on the conveyor, adjacent the electrodes, to position the end of the pipe relative thereto, means for moving the stop axially of the pipe, and means for moving the stop laterally therof.

33. In a welding machine, means for supporting pipe lengths in end to end relation, fixed and movable means for gripping the lengths respectively, and means for moving the movable gripping means toward the fixed gripping means, including pull up members symmetrically disposed about the pipe axis.

34. In a welding machine, fixed and movable means for gripping respectively sections of pipe to be welded, and means for moving the movable means with its section toward the fixed means and its section including simultaneously acting fluid cylinders symmetrically disposed about the axis of the pipe, and tension members actuated thereby and secured to the movable means for causing endwise movement of its section.

35. A pipe welding machine comprising a welding means, a supply station on each side thereof for pipes to be welded, conveyors for delivering pipes in alined relation from the stations to said means, and means for lifting pipes from one of the supply stations onto the conveyor.

36. In an apparatus for connecting pipes end to end, openable welding electrodes, supply stations on both sides of the electrodes, means for feeding pipes individually from said stations, roll tables for supporting them in position for engagement by said electrodes, and tilting arms for discharging the welded pipes as a unit laterally of the welder.

37. In a pipe joining apparatus, spaced supply stations, a welder having electrodes intermediate said stations and slightly in advance thereof, means for supplying pipes to the welder from said stations for end to end connection, a delivery table ahead of the welder, and means for advancing a welded pipe radially from the welder to the table.

38. In an apparatus for periodically welding pipes end to end, holding means for gripping the pipes during welding having openable jaws, roll tables for supplying pipe to said jaws, and tilting arms for removing pipe laterally therefrom.

39. In an apparatus for welding pipe, spaced supply stations, means for advancing pipes sidewise from said stations, means for butting the ends of the pipe, means for welding the butted ends, and means for advancing the welded pipe sidewise to a receiver.

40. Apparatus for the manufacture of welded pipes in which abutting pipe sections are welded in end-to-end relation, comprising a welding unit in which the pipe sections are welded, means for moving the welded pipes sidewise from said unit and without substantial endwise movement, a reamer for engaging the pipe after it has moved sidewise of the welding unit, and means for operating the reamer for projecting it into the pipe to the zone of the weld, the zone of the weld being maintained in predetermined relation to the reamer by reason of the fact that no substantial endwise movement of the pipe occurs.

41. Apparatus for welding lengths of pipe together in end-to-end relation, comprising a welding unit for welding two abutting lengths of pipe, means for effecting sidewise movement of the resulting welded pipe substantially without endwise movement thereof, a flash removing reamer disposed laterally of said means, said reamer being movable from a retracted position where it is clear of the pipe to an extended position where it is alongside the welding unit, and means for operating the reamer to project it into a pipe when the pipe is on said means and for retracting it when the flash has been removed from the pipe, the zone of the weld in the pipe being maintained in predetermined relation to the reamer by reason of the fact that the pipe is presented to the reamer before substantial endwise movement thereof has occurred.

42. Apparatus for welding lengths of pipe together in end-to-end relation, comprising a welding unit for welding two abutting lengths of pipe, means for effecting sidewise movement of the resulting welded pipe substantially without endwise movement thereof, a flash removing reamer disposed laterally of said means, said reamer being movable from a retracted position where it is clear of the pipe to an extended position where it is alongside the welding unit, and means for projecting the reamer into the pipe relatively rapidly until the reamer reaches the zone of the weld and for thereafter projecting the reamer relatively slowly to remove the flash and for thereafter retracting the reamer, the zone of the weld in the pipe being maintained in predetermined relation to the reamer by reason of the fact that the pipe is presented to the reamer before substantial endwise movement thereof has occurred.

JOHN W. FREE.
ROBERT ANDERSON.